Oct. 27, 1936.   J. A. KRECEK ET AL   2,058,601
TELETYPEWRITER SYSTEM
Filed Nov. 1, 1934   6 Sheets-Sheet 1

INVENTORS  J. A. KRECEK
C. C. MUNRO
BY
J. W. Schmied
ATTORNEY

INVENTORS J. A. KRECEK
C. C. MUNRO
BY
J. W. Schmied
ATTORNEY

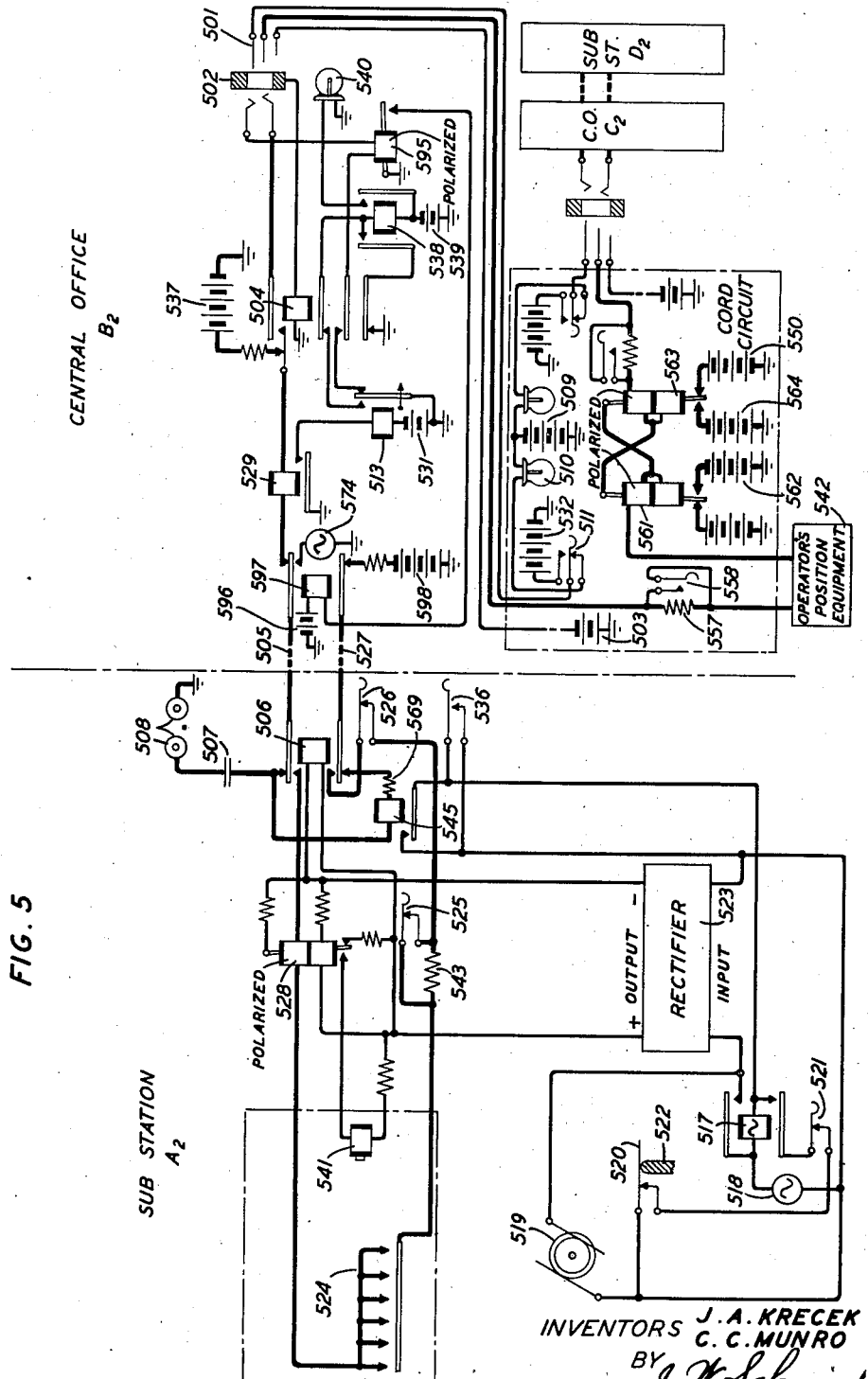

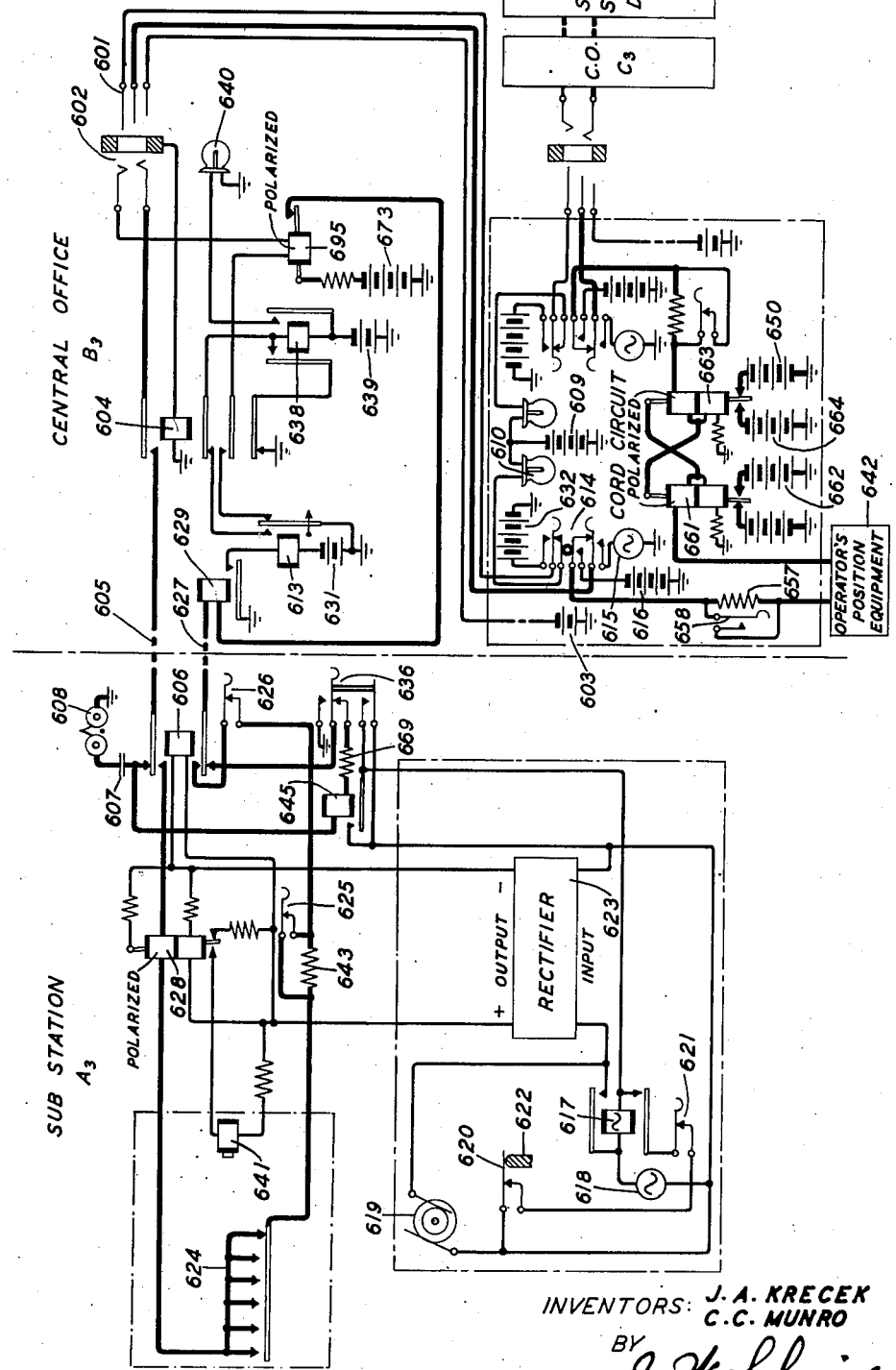

UNITED STATES PATENT OFFICE 2,058,601

TELETYPEWRITER SYSTEM

Joseph A. Krecek, Brooklyn, N. Y., and Charles C. Munro, East Orange, N. J., assignors to Bell Telephone Laboratories, Incorporated, New York, N. Y., a corporation of New York Application November 1, 1934, Serial No. 750,923

15 Claims. (Cl. 178—2)

This invention concerns improvements in normally closed loop teletypewriter systems. These improvements relate chiefly to means for overcoming trouble caused by differences in ground potential.

In normally closed loop teletypewriter systems, trouble is sometimes experienced because of differences in ground potential. The trouble is chiefly concerned with various signaling arrangements, such as call, recall, and answer signaling arrangements. It also sometimes causes faulty or unintentional operation of instrumentalities for starting teletypewriter motors located at unattended stations. For example, if a signaling device is capable of being operated by a marginal relay, current caused by differences in ground potential might increase or decrease the normal line current to such an extent that either the marginal relay might be unintentionally operated or it might not operate when intended. Likewise, if a signaling arrangement is intended to be operated by reversing the polarity of the normal line current, current caused by differences in ground potential might oppose or overcome a weak line current so that the signaling arrangement might either be unintentionally operated or might not operate when intended.

Accordingly, it is an object of this invention to reduce trouble caused by differences in ground potential by so arranging normally closed loop teletypewriter systems that the grounds will all be located at one station; namely, the central office.

Another object of this invention is to provide an improved calling arrangement for enabling a subscriber to call an operator at a central teletypewriter office.

Still another object of this invention is to provide an improved arrangement for enabling a subscriber to answer a call from an operator at a central office.

A further object of this invention is to provide an improved arrangement for enabling an operator to start a teletypewriter motor located at an unattended station.

In accordance with this invention, when a subscriber wishes to call an operator at a central office, he operates instrumentalities which vary the amount of current normally passing over the normally closed loop extending from the subscriber's station to a central office. An electro-responsive device, located at the central office and connected into the line, responds to the variation in the amount of line current and closes an energizing circuit for operating a calling device located at the central office. This calling device remains operated until the operator answers the subscriber's call.

When an operator wishes to start a teletypewriter motor located at an unattended station, she operates instrumentalities at the central office for reversing the polarity of the current normally passing over the line extending from the central office to the unattended station. This reversal of polarity causes an electro-responsive device, located at the unattended station and bridged across the line, to connect the local source of power supply at the unattended station to the motor and to start the motor.

A modification of the invention enables a central office operator to call a subscriber by applying positive current to the line thereby causing a direct current polarized bell, located at the subscriber's station and connected into the line, to ring.

These and other features of the invention will be described in detail in connection with the drawings in which.

Fig. 5 shows another modification of the invention by means of which an operator can call a subscriber by operating a ringer with alternating current and can start the motor of an unattended subscriber's station by reducing the amount of the line current; and Fig. 6 represents still another modification of the invention which is designed to eliminate current drain during the normally unoperated condition of the circuit.

Figure 1:
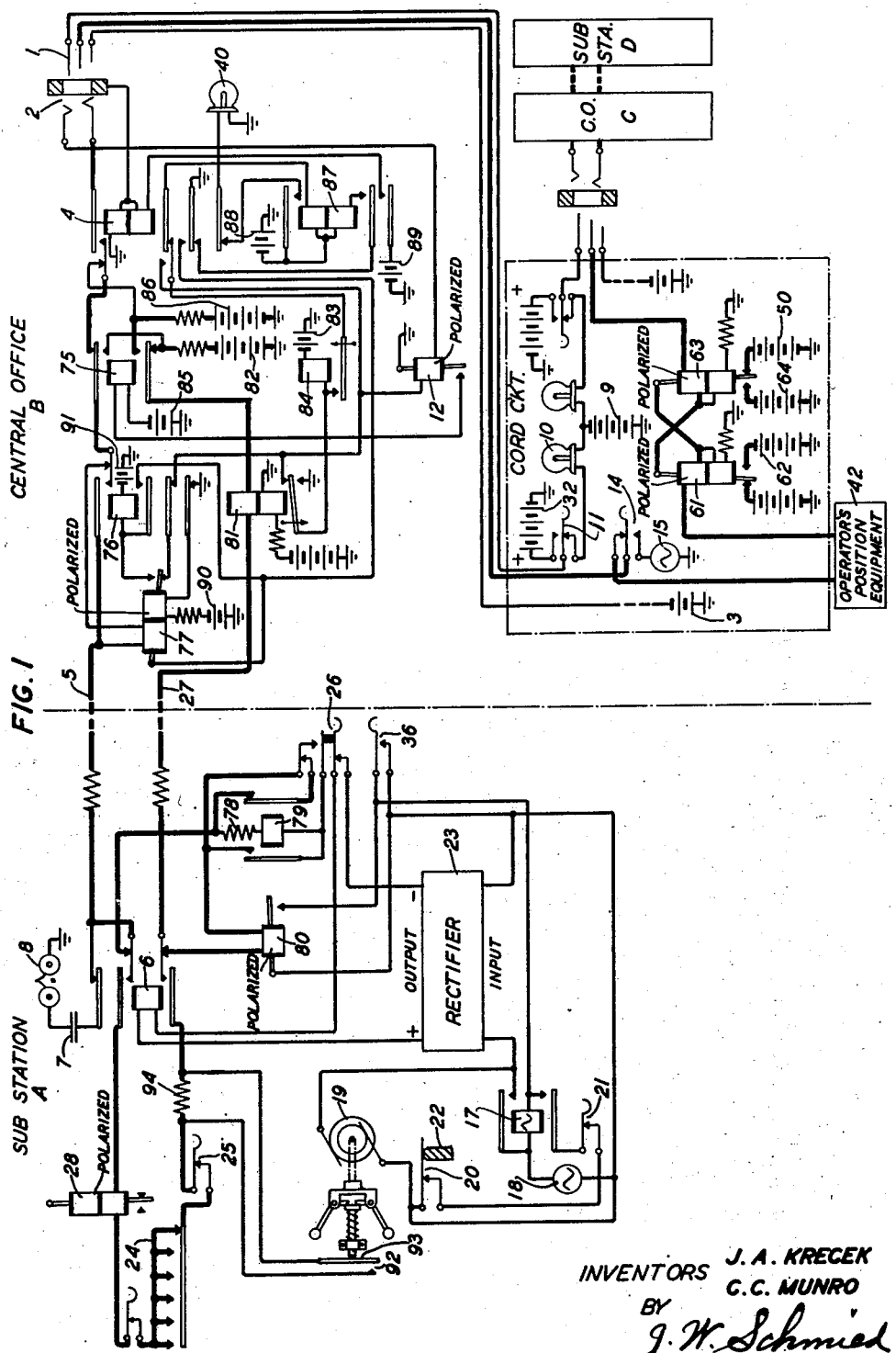
Fig. 1 shows one circuit arrangement of the invention in which an operator at a central office can start the teletypewriter motor of an unattended subscriber's station by reversing the polarity of the line current and in which a subscriber can call an operator by reducing the amount of the line current.

Fig. 1 illustrates a normally closed teletypewriter circuit extending from subscriber's station A to central office B and then to central office C and subscriber's station D. In the normal condition of this circuit, positive current from battery 86 passes over the top contact of non-operated relay 4, top armature of non-operated relay 75, top contact of non-operated relay 76, through the left winding of differential relay 77, over line conductor 5 to station A, middle contact of non-operated relay 6, right armature of non-operated relay 79, top set of contacts of key 26, winding of polarized relay 80, bottom contact of non-operated relay 6, over line conductor 27 to central office B, through the top winding of differential relay 81, bottom armature of non-operated relay 75, battery 82, and then to ground. This operates differential relay 81, but because relay 80 is polarized to operate only on negative current, relay 80 remains non-operated now.

The teletypewriter of the subscriber at station A may be connected to the teletypewriter equipment 42 of the operator at central office B or to that of the operator at central office C. Also, it may be connected to the teletypewriter of the subscriber at station D.

If the operator at a central office, such as central office B, wishes to call a subscriber, such as the subscriber at station A, the operator will first insert plug 1 into jack 2. This closes a path for negative current from battery 3 to pass through the sleeve contacts of plug 1 and jack 2, through the upper winding of relay 4 and then to ground thereby operating relay 4. The operator then moves key 14 to its lower position for a period of about two seconds. This closes the ringing circuit from alternator 15, through key 14, ring contacts of plug 1 and jack 2, top armature of operated relay 4, top armature of non-operated relay 75, top contact of non-operated relay 76, left winding of differential relay 77, out over line conductor 5 to station A, top contact and armature of non-operated relay 6, condenser 7, ringer 8, and then to ground. Relays 77 and 80 are not affected by this ringing current and remain in the condition shown in Fig. 1.

At the same time, a path is closed for negative current from battery 9 to pass through supervisory lamp 10, key 11, tip contacts of plug 1 and jack 2, through the polarized relay 12, middle bottom armature of non-operated relay 76, armature of non-operated relay 77, middle bottom armature of operated relay 4, and then to ground. This causes supervisory lamp 10 to light as an indication to the operator at central office B that the station equipment at station A is not yet cut-in. When the subscriber at station A answers the operator's call, lamp 10 is extinguished in a manner that will be described subsequently. Since relay 12 is polarized to operate on positive current and not on negative current, it does not operate at this time.

If the subscriber is present at station A and wishes to answer the operator's call, he can do so by momentarily closing key 36. This closes a path alternating current from power supply source 18 to pass through and operate alternating current relay 17 which then locks-up through its bottom armature. At the same time, an energizing path is closed for operating motor 19 from source 18, top armature of operated relay 17, motor 19, and then back to source 18. Also, a path is closed through the top armature of operated relay 17 for energizing rectifier 23.

Rectifier 23, upon being energized, generates direct current which operates relay 6 which, in turn, closes both its armatures thereby cutting into the loop the station printer equipment comprising line relay 28, sending contacts 24, and break key 25. The subscriber then transmits a series of significant current variations to inform the operator at central office B that the call has been answered. During the intervals when spacing signals are being transmitted over the loop, there will be an absence of current in the left winding of differential relay 77. This will enable the biasing current through the right winding of relay 77 to cause relay 77 to operate its armature and thereby open the energizing circuit for supervisory lamp 10. Consequently, lamp 10 will be extinguished thereby indicating to the operator that the subscriber at station A has cut-in his teletypewriter and that communication may now take place.

During the time that relay 77 is operated, a path is closed from battery 91, through relay 76, armature of operated relay 77, middle bottom armature of operated relay 4, and then to ground thereby operating relay 76. Relay 76 locks-up through its upper bottom armature subject to the non-operation of relay 4. The lower bottom armature of relay 76, when operated, opens the path through the biasing winding of relay 77 and the top armature of relay 76 opens the path through the other winding of relay 77. This serves to shunt relay 77 out of the loop subject to the non-operation of relay 4. The circuit is now ready for communication.

The subscriber at station A can recall the operator at central office B by momentarily operating key 26 to its upper position. This causes the upper set of contacts of key 26 to shunt high resistance 78 and relay 79 into the loop circuit. At the same time, the lower set of contacts of key 26 opens the energizing circuit for relay 6 thereby causing relay 6 to release its armatures. In so doing, relay 6 cuts out the station printer equipment and the loop circuit now extends from line conductor 5, middle contact of non-operated relay 6, high resistance 78, relay 79, upper set of contacts of key 26, relay 80, lower contact of relay 6, line conductor 27, relay 81, bottom armature of non-operated relay 75, battery 82, and then to ground. This energizes relay 79 and causes it to operate its armatures. Relay 79 locks-up through its left armature but performs no useful function at this time. Resistance 78 is high enough to reduce the loop current to approximately one half its normal amount.

This reduced loop current allows relay 81 to release its armature due to the differential effect of the biasing winding. This applies ground to an energizing circuit from battery 83 to operate relay 84. Incidentally, relay 84 is of the slow-to-operate type so that it will not operate its armature unless relay 81 remains non-operated for a definite time interval. This, together with the fact that relay 81 is of the slow-to-release type prevents relay 84 from operating its armature in response to the transmission of ordinary message impulses.

When relay 84 operates, it closes a path from ground over the armature of non-operated relay 81, over the armature of operated relay 84, top lower contacts of operated relay 4, through relay 12, tip contacts of jack 2 and plug 1, key 11, lamp 10, battery 9, and then to ground. This causes supervisory lamp 10 to light and give a recall signal to the operator at central office B.

When the subscriber restores key 26 to the position shown in Fig. 1, relay 6 will again be energized and operate its armatures thereby cutting the station printer equipment into the loop. This opens the locking-up circuit for relay 79 thereby causing it to release. The restoration of key 26 also shunts resistance 78 out of the loop circuit. This restores the line current to its normal value thus enabling relay 81 to operate. Relay 84 releases and causes lamp 10 to be extinguished.

If desired, the recall arrangement described above may be modified by designing the apparatus to operate on one-quarter of the normal loop current. This can be done by inserting a resistance of three times the normal loop resistance into the path through the right armature of relay 79. The value of this modified arrangement is that it saves power by reducing the loop current in the idle condition to one-quarter the usual amount. Also it does not change the operation of the relays in the circuit because the supervisory current is still one-half of the normal loop current since the supervisory path leads through resistance 78.

In case station A is unattended, there will be no response to the operator's ring. In this event, if the operator wishes to leave a message on the subscriber's teletypewriter, she may do so by starting motor 19 of the unattended teletypewriter. To do this key 11 is operated to its upper position thereby closing a circuit for positive current from battery 32 to pass through key 11, tip contacts of plug 1 and jack 2, polarized relay 12, middle bottom armature of non-operated relay 76, armature of non-operated relay 77, middle bottom armature of operated relay 4, and then to ground. Since relay 12 is polarized to operate on positive current, but not on negative, it now operates. This closes a path for current from battery 85 to pass through relay 75, armature of operated relay 12, and then to ground thereby operating relay 75. Relay 75, in operating its armatures, switches battery 86 into the loop in place of battery 82. Since battery 86 is of opposite polarity to battery 82, the polarity of current flowing in the loop will be reversed. Relay 80 is polarized to operate on positive current but not on negative current, so it now operates its armature.

The operation of the armature of relay 80 has the same effect as the closing of key 36; that is, it closes a path for alternating current from power supply source 18 to operate relay 17. This, as has been described above, starts the teletypewriter motor 19 and energizes rectifier 23. The operator at central office B may now cause the teletypewriter at station A to record any message desired. Since relay 17 locks-up, as stated above, motor 19 and rectifier 23 remain operated until the locking-up circuit is opened by either the operation of local stop key 21 or of motor stop contacts 20.

When station A is unattended, the operator at central office B, at the termination of communication, will transmit a preassigned stop signal, such as upper case H. This causes an upward thrust of stunt bar 22 thereby opening motor stop contacts 20. This opens the locking-up circuit for relay 17 which consequently becomes non-operated. As a result, this opens the energizing paths for motor 19 and rectifier 23 which then become non-operated until relay 17 is energized again. Lastly, the operator withdraws plug 1 from jack 2 thereby causing the circuit to return to its normal condition as shown in Fig. 1.

When the subscriber at station A desires to call the operator at central office B, he may do so by first momentarily closing key 36. This starts his teletypewriter motor 19 and energizes rectifier 23 and relay 6. The subscriber then momentarily closes key 26 which, as has been described above, causes relay 6 to release and reduces the loop current to about one-half its normal amount. This reduced current allows relay 81 to release its armature due to the differential effect of its biasing winding. This applies ground to an energizing circuit from battery 83 to operate relay 84.

When relay 84 operates it closes a path from ground, over the armature of non-operated relay 81, armature of operated relay 84, top lower armature of non-operated relay 4, upper winding of relay 87, battery 88, and then to ground thereby operating relay 87. Relay 87 locks up through its bottom winding, middle armature, and middle bottom armature of non-operated relay 4 subject to the operation of relay 4. The bottom armature of relay 87 closes a path from battery 89 through the lower winding of relay 4 to the sleeve contacts of jack 2 in order to make the sleeve of the circuit test busy at the switchboard.

At the same time, a path is closed from battery 88, top armature of operated relay 87, lower bottom armature of non-operated relay 4, line lamp 40, and then to ground. This causes line lamp 40 to light thereby indicating to the operator at central office B that the subscriber at station A desires attention. Relay 77 also operates at this time, but performs no useful function.

In answering this call, the operator at central office B inserts plug 1 in jack 2 thereby operating relay 4 in the manner described above. When relay 4 operates its armatures, its lower bottom armature opens the energizing path for line lamp 40 thereby extinguishing lamp 40. The middle bottom armature of relay 4 opens the locking-up circuit through relay 87 causing this relay 87 to become non-operated. This same armature also puts ground on a path leading from the armature of operated relay 77, middle bottom armature of operated relay 76, through relay 12, tip contacts of jack 2 and plug 1, key 11, supervisory lamp 10, battery 9, and then to ground thereby lighting lamp 10. The upper bottom armature of relay 4 opens the path from relay 84 to relay 87. Relay 4, in operating its top armature, removes battery 86 from the ring side of the loop and cuts this side of the loop through to the cord circuit.

When the operator transmits significant current variations comprising marking and spacing impulses, relay 77 will operate during the spacing impulses due to current from battery 90 passing through its biasing winding, lower bottom armature of non-operated relay 76, and then to ground. The operation of relay 77 removes ground from the energizing path for supervisory lamp 10 thereby extinguishing lamp 10. During the time that relay 77 is operated, a path is closed from battery 91, through relay 76, armature of operated relay 77, middle bottom armature of operated relay 4, and then to ground thereby operating relay 76. Relay 76 locks-up through its upper bottom armature subject to the non-operation of relay 4. The lower bottom armature of relay 76, when operated, opens the path through the biasing winding of relay 77 and the top armature of relay 76 opens the path through the other winding of relay 77. This serves to shunt relay 77 out of the loop subject to the non-operation of relay 4. The circuit is now ready for communication.

In case there is something wrong with the subscriber's teletypewriter motor 19 so that it is not functioning properly and does not come up to operating speed, the centrifugal contacts 92 located on the shaft of motor 19 will not be closed by centrifugal plunger 93 in the manner described in a copending application filed July 12, 1934, in the name of T. L. Corwin and bearing Serial No. 734,709. Consequently, high resistance 94 will not be shunted out of the circuit, but will remain in the circuit and thereby reduce the loop current to approximately one-half its normal value. This will cause the release of relay 81 as was described in connection with the description of the transmission of a recall signal. The release of relay 81 causes the operation of relay 84. This closes a path from ground over the armature of non-operated relay 81, armature of operated relay 84, top lower contact of operated relay 4, relay 12, tip contacts of jack 2 and plug 1, key 11, supervisory lamp 10, battery 9, and then to ground. This keeps lamp 10 lit as a signal to the operator that the circuit is not yet ready for communication.

If the subscriber at station A wishes to discontinue communication with the operator at central office B, he can transmit a disconnect signal by elevating key 26 to its upper position and holding it there for a definite time interval. As has been explained above, the operation of key 26 causes relay 6 to release and shunts resistance 78 into the loop thereby reducing the loop current to about one-half its normal value. This reduction of the loop current allows relay 81 to release which applies ground to a path for energizing relay 84. This applies ground to the tip contacts of jack 2 and plug 1 thereby lighting supervisory lamp 10 as an indication to the operator that the subscriber desires to be disconnected. This distinguishes from a recall signal in that lamp 10 is now lit for a definite time interval whereas it was only lit momentarily for a recall signal. At the same time, the subscriber operates his local stop key 21 which disconnects his local power supply source 18 from his motor 19 and rectifier 23.

Accordingly, the operator removes plug 1 from jack 2 thereby causing relay 4 to release. Since the subscriber at station A only operated key 26 momentarily, it will be returned to the position shown in Fig. 1. This would have energized relay 6 again but for the fact that the subscriber had opened his local stop key 21 thereby opening the locking-up circuit for relay 17. As a result, motor 19, rectifier 23, and relay 6 cease to be energized. This places the circuit in its normal condition with all relays non-operated as shown in Fig. 1.

In case the subscriber at station A has his teletypewriter connected to that of the subscriber at station D and wishes to transmit a break signal to the subscriber at station D, he may do so by opening his break key 25. The opening of break key 25 sends an open signal out over the line and thus serves as a break signal.

Figure 2:
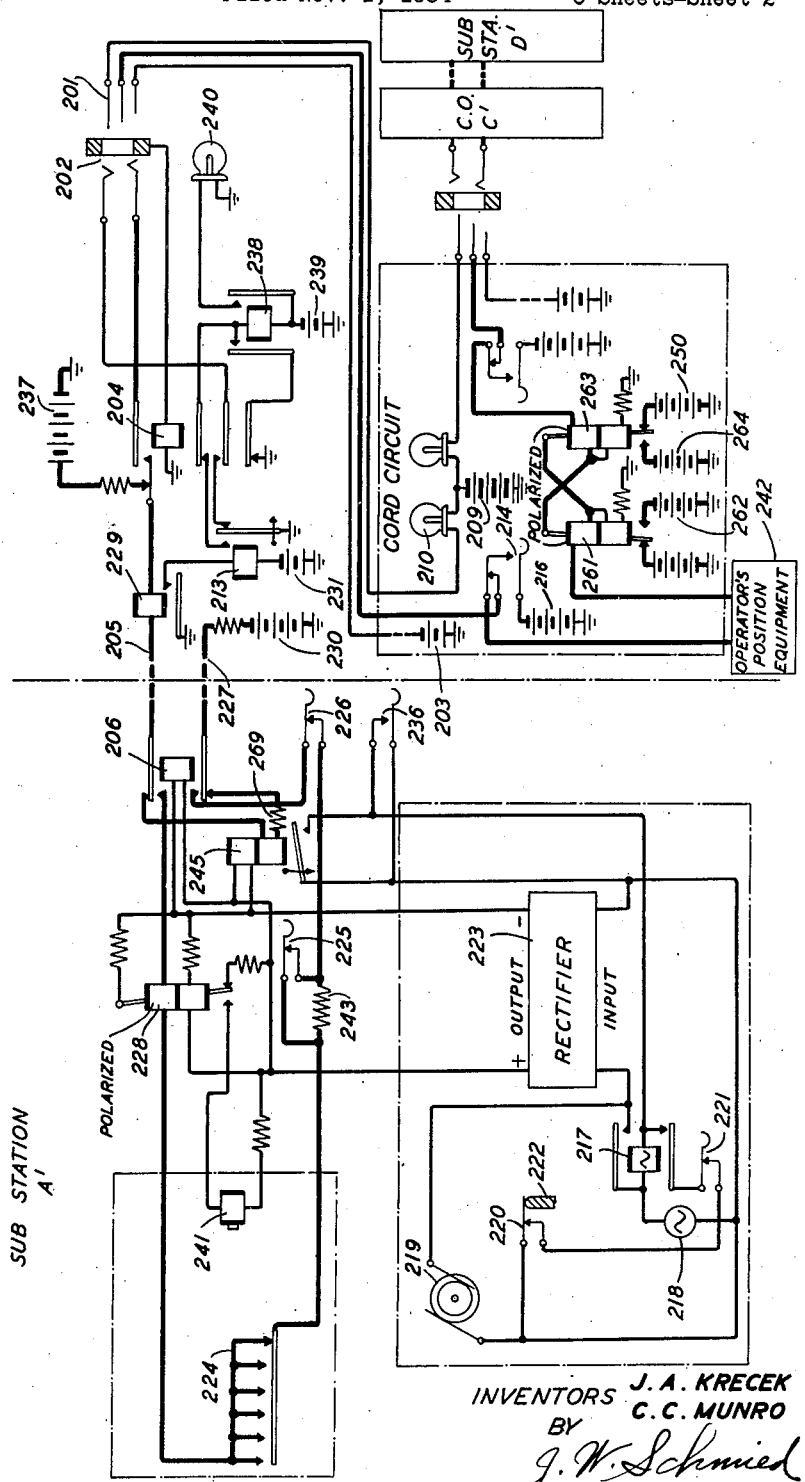
Fig. 2 illustrates a modification of the invention in which the teletypewriter motor at either an attended or unattended subscriber's station is started by an operator at a central office in initiating a call.

Fig. 2 shows a normally closed circuit in which the teletypewriter motor at any subscriber's station is started by an operator at a central office when a call is being made to either an attended or to an unattended subscriber's station. When a subscriber originates a call, he starts the motor of his teletypewriter. Either the operator or the subscriber may discontinue the operation of the subscriber's teletypewriter motor.

In the normal condition of the circuit, all the relays are non-operated except slow-to-release relay 245 which is energized by positive current from battery 237 which passes over the top contact of non-operated relay 204, through marginal relay 229, over line conductor 205, top armature of non-operated relay 206, bottom winding of relay 245, resistance 269, bottom armature of non-operated relay 206, line conductor 227, battery 230, and then to ground. Marginal relay 229 will not now be operated because resistance 269 is high enough to reduce the current normally flowing in the loop to an amount insufficient to operate relay 229.

If the operator at a central office, such as central office B', wishes to communicate with a subscriber's station, such as station A', whether it is attended or unattended, procedure will be the same. First, the operator will insert plug 201 in jack 202. This closes a path for negative current from battery 203 to pass through and operate relay 204. This negative current also makes the sleeve test busy.

When relay 204 operates its armatures, they cut the central office cord circuit into the loop thereby substituting positive current from battery 250, instead of from battery 237. This positive current passes out over line conductor 205 to station A' and maintains slow-to-release relay 245 operated. Marginal relay 229 remains non-operated. At this time, a path is closed from battery 209, through lamp 210, tip contacts of plug 201 and jack 202, middle bottom armature of operated relay 204, armature of non-operated relay 213, and then to ground. This causes lamp 210 to light as an indication to the operator that the station printer equipment at station A' has not yet been cut-in.

To cut-in the printer equipment at station A', the operator at central office B' opens key 214 momentarily, thus opening the transmission circuit. This causes relay 245 to release its armature which closes a path for enabling alternating current from power supply source 218 to operate the teletypewriter motor 219, rectifier 223, and alternating current relay 217. Although switch 214 is only operated momentarily, relay 217 locks-up through its bottom armature and keeps the energizing circuit for motor 219 and rectifier 223 closed until either motor stop contacts 220 or local stop contacts 221 are opened.

Direct current from rectifier 223 will operate relay 206 which cuts in the station printer equipment comprising line relay 228, sending contacts 224, break key 225, and recall key 226. Relay 245 is held operated by direct current from rectifier 223 passing through its upper winding so that the power source 218 may be subquently disconnected from the printer equipment by opening the motor stop contacts 220 or local stop contacts 221. Otherwise, if relay 245 were allowed to remain deenergized, its armature contact would be closed and the operation of either contact 220 or 221 would be ineffective.

When the station printer equipment is cut into the line, the line current will be increased because the resistance of the printer equipment is lower than the resistance 269. This increase in the line current will enable marginal relay 229 to operate its armature which closes a path for current from battery 231 to energize relay 213. As a result, relay 213 will operate its armature and open the energizing path for lamp 210. Consequently, supervisory lamp 210 will now be extinguished thereby indicating to the operator at central office B' that the motor 219 and rectifier 223 at the subscriber's station A' have been energized and that the station printer equipment has been cut-in. Communication may now take place thus saving the subscriber the trouble and delay of answering the operator's call. Relay 245 is of the slow-to-release type to prevent it from being unintentionally released by line hits.

The subscriber at station A' can recall the operator at central office B' by momentarily opening his recall key 226 which opens the loop circuit and causes relay 229 to release. This causes relay 213 to release and close the energizing circuit for supervisory lamp 210, thereby lighting lamp 210. When recall key 226 is closed, relays 229 and 213 will operate and lamp 210 will be extinguished. By repeatedly and alternately opening and closing recall key 226, the subscriber can give a flashing recall signal to the operator. The operator may signal the subscriber by some preassigned signal, such as by operating the bell key (not shown).

At the termination of communication, either the operator or the subscriber may disconnect the station printer equipment by transmitting a preassigned disconnect signal, such as upper case H. This, as has been explained above, causes an upward thrust of stunt bar 222 which opens the motor stop contacts 220 thereby opening the locking-up circuit for relay 217 and disconnecting the power supply source 218.

The subscriber may also shut down his printer equipment by momentarily opening his local stop contacts 221 which in turn open the locking-up circuit for relay 217. In either case, the disconnection is made known to the operator by the lighting of supervisory lamp 210 due to relays 229 and 213 releasing. This disconnect signal distinguishes from a recall signal in that it causes a steady lighting of lamp 210 whereas a recall signal effects only a momentary lighting of lamp 210.

When the subscriber at station A' desires to call the operator at central office B', he may do so by momentarily closing his call key 236. This has the same effect as the release of the armature of relay 245 in that it connects the power supply source 218 to motor 219, relay 217, and rectifier 223. Direct current from rectifier 223 will operate relay 206 and maintain relay 245 operated. Relay 229 will also operate at this time and close the energizing circuit for relay 213. The operation of relay 213 closes a path from ground through its operated armature, top bottom armature of non-operated relay 204, through relay 238, battery 239, and then to ground. This causes relay 238 to operate its armatures and to lock up through its left armature subject to the operation of relay 204. The right armature of relay 238 closes a path for current from battery 239 to operate line lamp 240. This serves to indicate to the operator at central office B' that communication is desired.

In aswering the call, the operator inserts plug 201 in jack 202 thereby closing a path for negative current from battery 203 to operate relay 204. This opens the locking-up path for relay 238 and causes it to release its armatures, thus opening the energizing path for lamp 240 and extinguishing it. Functioning as previously described then takes place.

When the subscriber wishes to transmit a break signal, he can do so by momentarily moving break key 225 to its upper position. This removes the short circuit across resistance 243 thereby reducing the line current to an amount large enough to maintain relay 229 operated but small enough to cause polarized relay 261 to swing its armature to its right contact. This applies negative current from battery 262 to the line leading to central office C' and subscriber's station D'. However, this line already has negative current applied to its other end at central office C' by a battery comparable to battery 230 at central office B'.

The negative current from these two batteries equals and opposes each other, thus preventing any current from flowing in that line. This, in effect, is equivalent to an opening of that line and causes the teletypewriter at subscriber's station D' to become inoperative, thereby indicating to the subscriber at station D' that the subscriber at station A' desires to interrupt him. At the same time, resistance 243 leaves the current in the line from station A' to central office B' sufficiently large to maintain relay 229 operated. This maintains relay 213 operated and prevents lamp 210 from lighting. In other words, it prevents a recall signal from being unintentionally given to the operator at central office B'.

Figure 3:
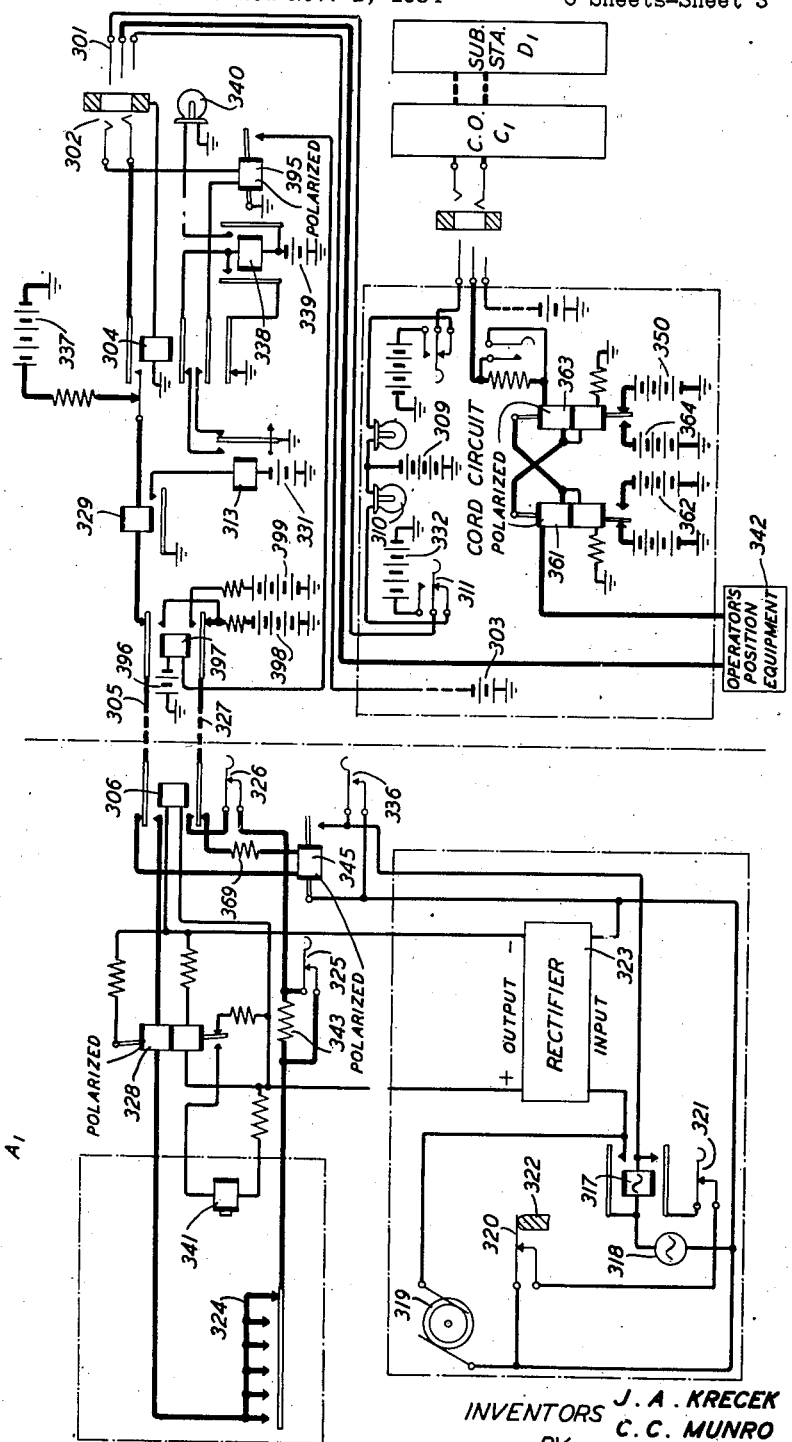
Fig. 3 represents an other form of the invention in which the teletypewriter motor at an unattended subscriber's station can be started in response to a reversal of polarity of the line current by an operator at a central office.

Fig. 3 illustrates a normally closed circuit which is similar to the circuit shown in Fig. 2 except that the subscriber's teletypewriter motor at an unattended station is started when the operator reverses the polarity of the current flowing over the loop. Thus, in starting the motor at an unattended station, the operator inserts plug 301 in jack 302 thereby operating relay 304. This closes a path for negative current to pass from battery 309, through lamp 310, over key 311, tip contacts of plug 301 and jack 302, polarized relay 395, middle bottom armature of operated relay 304, armature of non-operated relay 313, and then to ground. Since relay 395 is polarized so as to operate on positive current but not on negative current, it will not be operated now.

When relay 304 operates, positive current from battery 350 passes through the operator's position equipment 342, ring contacts of plug 301 and jack 302, top armature of operated relay 304, relay 329, top armature of non-operated relay 397, line conductor 305, top armature of non-operated relay 306, polarized relay 345, resistance 369, bottom armature of non-operated relay 306, line conductor 327, bottom armature of non-operated relay 397, battery 398, and then to ground. Relay 345 is polarized to operate on negative current but not on positive current, so it remains non-operated under this condition. Supervisory lamp 310 will light over a path from battery 309 to the ground connected to the armature of non-operated relay 313.

In order to start the motor 319 at the subscriber's station A₁ and to cut-in the station printer equipment, the operator at central office B₁ momentarily moves key 311 to its upper position. This substitutes positive current from battery 332 for the negative current from battery 309. Since relay 395 is polarized so as to operate only on positive current, it will operate its armature now. This closes a path for current from battery 396 to pass through relay 397 to ground thereby energizing relay 397 and causing it to operate its armatures.

When relay 397 becomes energized and operates its armatures, it reverses the direction of current flowing over the loop. Now positive current from battery 399 will pass over the bottom armature of operated relay 397, line conductor 327, bottom armature of non-operated relay 306, resistance 369, polarized relay 345, top armature of non-operated relay 306, line conductor 305, top armature of operated relay 397, battery 398, and then to ground. Since relay 345 is polarized to operate only on positive current, this current reversal causes polarized relay 345 to operate its armature.

The operation of the armature of relay 345 has the same effect as the closing of key 336; namely, it closes a path for alternating current from power supply source 318 to energize motor 319, alternating current relay 317, and rectifier 323. Direct current from rectifier 323 will energize relay 306 and cause it to operate its armatures and thereby cut the station printer equipment into the loop. Due to printer equipment resistance being less than resistance 369, the line current will be increased sufficiently to operate marginal relay 329 which operates relay 313. This causes lamp 310 to be extinguished thereby indicating to the operator that the station equipment at station A₁ has been cut-in. When the operator moves key 311 back to the position shown in the drawings, the circuit will be ready for communication to take place.

Figure 4:
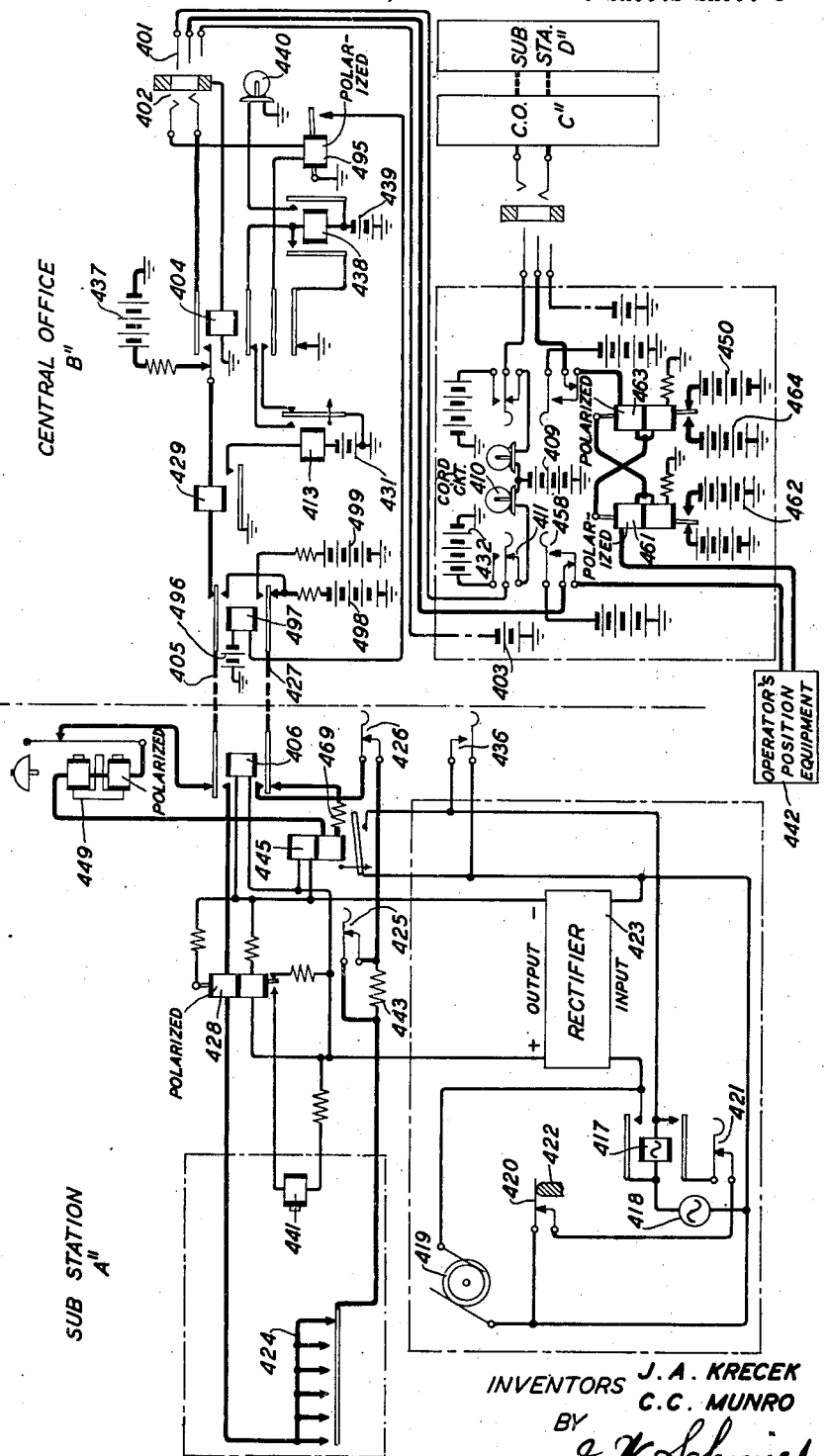
Fig. 4 depicts a modification of the invention which employs a direct current bell, polarized to operate only on negative current, to call a subscriber.

Fig. 4 represents a normally closed circuit, the operation of which is similar to that of the circuit shown in Fig. 3 except that the circuit shown in Fig. 4 includes calling apparatus by means of which an operator can call a subscriber. To call a subscriber, such as the subscriber at station A", the operator first inserts plug 401 in jack 402 thereby enabling current from battery 403 to operate relay 404. The operator then momentarily moves key 411 to its upper position. This closes a path for positive current from battery 432 to pass through key 411, tip contacts of plug 401 and jack 402, through polarized relay 495, middle bottom armature of operated relay 404, armature of non-operated relay 413, and then to ground.

Since relay 495 is polarized so as to operate on positive current but not on negative current, it will operate its armature now thereby enabling current from battery 496 to energize relay 497. This operates relay 497 which, as was explained in the description of the operation of the circuit shown in Fig. 3, reverses the direction of the current flowing over the loop and applies negative current from battery 498 to line conductor 405 instead of positive current from battery 450. This negative current causes the operation of direct current polarized bell 449 which is so polarized as to operate on negative current but not on positive. The operation of bell 449 serves to call the subscriber at station A".

The reversed current also flows through the lower winding of relay 445. Since relay 445 is of the slow-to-release type, it does not release during the momentary breakings of the circuit by the polarized bell 449. This prevents the motor 419 from being unintentionally started by these momentary openings of the line.

If the subscriber at station A" is present and hears the operator's call, he can answer it by closing key 436 which connects the power supply source 418 to motor 419, relay 417 and rectifier 423. Direct current from rectifier 423 will operate relay 406. This will operate marginal relay 429 in the manner described above. Relay 413 will now operate and extinguish lamp 410 as an indication to the operator that the station equipment at station A" has been cut-in.

If station A" happens to be unattended, the operator at central office B' can start its motor 419 and cut-in the station printer equipment by momentarily operating key 458 which serves to open the ring lead. This causes relay 445 to release its armature which has the same effect as the closing of key 436; namely, it connects power supply source 418 to motor 419, relay 417, and rectifier 423. Direct current from rectifier 423 operates relay 406 which cuts-in the station printer equipment. Communication may now take place.

At the conclusion of communication, the operator transmits a preassigned signal, such as upper case H. This causes an upward thrust of stunt bar 422 which opens motor stop contacts 420. As a result, the locking-up circuit for relay 417 is opened, thereby releasing relay 417 which disconnects the power supply source 418. When the operator pulls plug 401 out of jack 402, the circuit returns to its normal condition as shown in Fig. 4.

Fig. 5 shows a normally closed circuit in which marginal relays 545 and 529 are normally non-operated because resistances 569 and 557 reduce the current, normally flowing over the loop, to an amount too small to operate them. Under this condition, no instrumentalities are actuated until either a subscriber or an operator originates a call.

If the operator at a central office, such as central office B₂, desires to call a subscriber, such as the subscriber at station A₂, she will first insert plug 501 in jack 502 thereby enabling current from battery 503 to operate relay 504. At the same time, a path is closed for enabling current from battery 509 to light supervisory lamp 510 as described above. This indicates to the operator that the subscriber's station printer equipment has not yet been cut-in.

The operator then moves key 511 to its upper position to substitute positive current from battery 532 for negative current from battery 509. This positive current operates polarized relay 595 which is polarized to operate only on positive current. The operation of polarized relay 595 closes a path for energizing relay 597. When relay 597 operates its armatures, alternating current from generator 574 is applied to line conductor 505 and operates ringer 508 at the subscriber's station A₂.

The operation of ringer 508 serves to call the subscriber. Relay 597, in operating, also opens the path through relay 545 thus preventing the alternating current from entering battery 598 and possibly damaging it. When the operator moves key 511 back to the position shown in Fig. 5, lamp 510 will be lit as previously described.

The subscriber can answer the operator's call by closing key 536 which causes his teletypewriter motor 519, rectifier 523 and relay 517 to be energized by power supply source 518 in the manner described above. Direct current from rectifier 523 will energize relay 506 which will then cut-in the station printer equipment and cut-out resistance 569. Since the resistance of the printer equipment is lower than resistance 569, the loop current will now be increased to an amount large enough to cause marginal relay 529 to operate its armature. This closes a path for current from battery 531 to energize relay 513. Relay 513 will now operate its armature thereby opening the energizing path for lamp 510. Lamp 510 will consequently be extinguished, thereby indicating to the operator that the subscriber's printer equipment has been cut into the loop. Communication may now take place.

The subscriber can recall the operator by momentarily opening his recall key 526 which momentarily opens the loop and allows relays 529 and 513 to release. When relay 513 releases its armature, an energizing path is closed for lighting supervisory lamp 510 as has been previously explained. Since the subscriber only opens key 526 momentarily, when key 526 is closed again, relays 529 and 513 will again be energized. Consequently, the energizing path for lamp 510 will be opened and lamp 510 will be extinguished. By repeating this procedure, the subscriber can cause lamp 510 to be alternately and repeatedly lit and extinguished, thus giving a flashing recall signal to the operator.

At the termination of communication, either the subscriber or the operator may disconnect the station printer equipment by means of a preassigned signal which, as has been explained above, causes motor start contacts 520 to be opened. The operator will be informed of the disconnection by means of lamp 510 being lit and remaining lit until the operator removes plug 501 from jack 502.

If, when the operator calls a subscriber, there is no answer due to the station being unattended, the operator may cut-in the station printer equipment by momentarily closing key 558. This short-circuits resistance 557 thereby increasing the current flowing in the loop to an amount large enough to enable marginal relays 529 and 545 to operate. The operation of relay 529 causes lamp 510 to be extinguished. The operation of relay 545 has the same effect as the closing of key 536; namely, it causes the teletypewriter motor 519, rectifier 523 and relay 517 to be energized by alternating current from power supply source 518. Direct current from rectifier 523 will operate relay 506 which then cuts-in the station printer equipment. Communication may now take place at the end of which the operator will transmit a preassigned signal which will cause motor stop contacts 520 to be opened. This will open the locking-up circuit of relay 517, thereby disconnecting the power supply source 518.

The subscriber can call the operator by momentarily closing key 536 which energizes his teletypewriter motor 519 and rectifier 523. Direct current from rectifier 523 operates relay 506 which cuts-in the station printer equipment and cuts-out resistance 569. Since the resistance of the station printer equipment is lower than resistance 569, the loop current will now be increased to an amount large enough to operate marginal relay 529. This closes a circuit for energizing relay 513 which in turn closes a path from ground over its armature, upper bottom contact of non-operated relay 504, through relay 538, battery 539, and then to ground. This energizes relay 538 which locks-up through its left armature subject to the operation of relay 504. At the same time, a path is closed from battery 539, right armature of operated relay 538, through lamp 540, and then to ground. This lights lamp 540 as an indication to the operator that the subscriber at station A₂ desires attention.

When the operator answers, relay 504 will be operated and will open the locking-up path of relay 538. This will cause relay 538 to release. This in turn will open the energizing path for lamp 540 thereby extinguishing lamp 540. Communication can now take place.

Fig. 6 illustrates a modification of the circuit shown in Fig. 5. The modification shown in Fig. 6 is designed to eliminate current drain during the normally unoperated condition of the circuit. Thus, under normal conditions no current flows through either relay 629 or relay 645 because the ring lead is open at the top contacts of non-operated relay 604.

When the operator originates the call, she first inserts plug 601 in jack 602 thereby enabling negative current from battery 603 to operate relay 604. The operator then operates key 614, thus closing a path from alternator 615, through key 614, ring contacts of plug 601 and jack 602, top armature of operated relay 604, line conductor 605, top armature of non-operated relay 606, condenser 607, ringer 608, and then to ground. This operates ringer 608 which serves to attract the subscriber's attention and to indicate that there is a call for him.

In order to prevent the alternating current from alternator 615 from entering battery 673 and possibly damaging it, the operator can apply positive current from battery 632 to the tip lead. To do this, key 614 is designed to close a path through its upper set of contacts from battery 632, tip contacts of plug 601 and jack 602, polarized relay 695, middle bottom armature of operated relay 604, armature of non-operated relay 613, and then to ground. Since relay 695 is polarized so as to operate on positive current only, it now operates its armature which opens the path from battery 673 through relay 629 to line conductor 627.

By alternately and repeatedly applying to the ring lead alternating current from alternator 615 and positive current from battery 650, the operator will be able to distinguish when the subscriber has answered because when the subscriber answers supervisory lamp 610 will be extinguished in the manner described above.

An unattended start is made by closing key 658 which short-circuits resistance 657. This increases the line current sufficiently to operate marginal relay 645 which has the same effect as the closing of start key 636 as described above.

When the subscriber originates a call, he momentarily operates key 636 which causes his teletypewriter motor 619, rectifier 623, and relay 617 to be energized in the manner previously described. Direct current from rectifier 623 operates relay 606 which cuts-in the station printer equipment. During the interval of time required for rectifier 623 to function and before relay 606 operates its armatures, a path is closed from ground, through the top set of contacts of key 636, bottom armature of non-operated relay 606, line conductor 627, relay 629, armature of non-operated relay 695, battery 673 and then to ground.

This enables marginal relay 629 to operate which in turn enables current from battery 631 to operate relay 613. Relay 613, in operating, closes a path from ground through the armature of operated relay 613, upper bottom armature of non-operated relay 604, through relay 638, battery 639, and then to ground, thereby operating relay 638. Relay 638 locks-up through its left armature subject to the operation of relay 604. At the same time a path is closed for enabling current from battery 639 to pass through the right armature of operated relay 638 and to light the subscriber's line lamp 640. The lighting of line lamp 640 serves to attract the attention of the operator and to inform her that the subscriber at station A₃ desires attention.

When the operator answers the call, she inserts plug 601 into jack 602 thereby enabling current from battery 603 to operate relay 604. The operation of relay 604 opens the locking-up circuit for relay 638. Consequently, relay 638 releases its armatures thereby opening the energizing circuit for lamp 640 and thus extinguishing lamp 640. Communication can now take place.

The above circuit arrangements have been shown and described in order to illustrate the principles and features of operation of this invention. It is to be understood that different arrangements employing the principles and features of operation of this invention may be designed. Accordingly, the invention is not to be limited to the arrangements shown in the drawings, but is to be restricted only by the claims appended hereto.

What is claimed is:

1. A teletypewriter system having in combination a central teletypewriter office, a subscriber's teletypewriter station having a motor and a source of power supply for operating the motor, said motor being normally disconnected from the source of power supply, a normally closed telegraph line extending from the central office to the subscriber's station, said line having current of a certain polarity normally passing over it, said system having various supervisory signaling arrangements, means for preventing false operation of said supervisory signaling arrangements, said means comprising grounding the line at only the central office, a normally non-operated electroresponsive device for connecting the subscriber's power supply source to his motor, said electroresponsive device being bridged across the line at the subscriber's station and being capable of being operated only by current of a polarity opposite to the certain polarity normally passing over the line, and instrumentalities at the central office for reversing the polarity of the current passing over the line for operating the electroresponsive device for connecting the subscriber's source of power supply to his motor and for starting the motor.

2. A teletypewriter system having in combination a central teletypewriter office, a subscriber's teletypewriter station having a motor and a power supply source for operating the motor but normally disconnected therefrom, a normally closed telegraph line extending from the central office to the subscriber's station, said line normally having negative current flowing over it and being grounded for direct current only at the central office, an instrumentality at the subscriber's station for connecting the subscriber's power supply source to his motor, said instrumentality being operable only by positive current, a normally non-operated electroresponsive device at the central office for reversing the polarity of the current flowing in the line, a normally non-operated polarized relay for operating the electroresponsive device, said polarized relay being operable only by positive current, and control means for applying positive current to the polarized relay.

3. A teletypewriter system having in combination a subscriber's station, a central teletypewriter office having a calling device for attracting the attention of a central office operator, a normally closed telegraph line extending from the central office to the subscriber's station and having current of a certain amount normally flowing over the line, said system having various supervisory signaling arrangements, means for preventing false operation of said supervisory signaling arrangements, said means comprising grounding the line at only the central office, said calling device being responsive to certain variations in the amount of current flowing in the line, and instrumentalities at the subscriber's station for varying the amount of current flowing in the line for operating the calling device at the central office.

4. In a teletypewriter system having in combination a central teletypewriter office, a subscriber's teletypewriter station having a teletypewriter motor, and a power supply source for operating the motor but normally disconnected therefrom, a normally closed telegraph line extending from the central office to the subscriber's station, said telegraph line being grounded only at the central office, instrumentalities for enabling an operator at the central office to connect the subscriber's power supply source to his motor for starting the motor, signaling means for lighting a lamp at the central office in case the subscriber's motor does not attain its operating speed, and control means operable when the subscriber's motor attains its operating speed for preventing the operation of the signaling means.

5. In a teletypewriter system having in combination a central teletypewriter office, a subscriber's teletypewriter station having a teletypewriter motor, and a power supply source for operating the motor but normally disconnected therefrom, a normally closed telegraph line extending from the central office to the subscriber's station, said telegraph line being grounded only at the central office, instrumentalities for enabling an operator at the central office to connect the subscriber's power supply source to his motor for starting the motor, signaling means for lighting a lamp at the central office in case the subscriber's motor does not attain its operating speed, and control means operable when the subscriber's motor attains its operating speed for preventing the operation of the signaling means, said control means including a set of contacts adapted to be closed by a centrifugal plunger attached to the shaft of the motor to short-circuit the signaling means.

6. A teletypewriter system including in combination a central teletypewriter office, a subscriber's teletypewriter station having a teletypewriter motor and rectifier, a power supply source for operating the motor and energizing the rectifier but normally disconnected therefrom, a normally closed telegraph line extending from the central office to the subscriber's station, said telegraph line being grounded only at the central office, instrumentalities for enabling an operator at the central office to connect the subscriber's power supply source to his motor and rectifier for starting the motor and for energizing the rectifier, switching means operable in response to the energizing of the rectifier for switching a resistance into the line to reduce the line current, signaling means operable in response to the reduction in line current after a certain time delay for lighting a signal lamp at the central office, and control instrumentalities for shunting the resistance out of the line to restore the line current to its normal value to prevent the operation of the signaling means, said control instrumentalities being operated by the motor when it has attained its operating speed.

7. A teletypewriter system having in combination a central teletypewriter office, a subscriber's teletypewriter station having a teletypewriter motor and a power supply source for operating the motor but normally disconnected therefrom, a normally closed telegraph line extending from the central office to the subscriber's station, said system having various supervisory signaling arrangements, means for preventing false operation of said supervisory signaling arrangements, said means comprising grounding the line at only the central office, a normally operated electroresponsive device located at the subscriber's station and connected into the line, a normally open set of contacts adapted to be closed by the electroresponsive device when non-operated for connecting the supply source to the motor, and an instrumentality at the central office for causing the electroresponsive device to become non-operated and to close the contacts for connecting the power supply to the motor.

8. A teletypewriter system having in combination two teletypewriter stations, a normally closed telegraph line extending from one station to the other, said line normally having positive current flowing over it, the first of said stations having a direct current polarized bell connected to the line and operable only by negative current, and the second of said stations having calling apparatus for reversing the polarity of the line current to apply negative current to the line for operating the bell.

9. A teletypewriter system including in combination, a central teletypewriter office, a subscriber's teletypewriter station, a normally closed telegraph line extending from the central office to the subscriber's station, said line being grounded for direct current only at the central office, calling means for attracting the attention of the subscriber, said calling means being operable only by alternating current, normally non-operated instrumentalities at the central office for applying alternating current to the line, said instrumentalities being operable by positive current, and control means for applying positive current to said instrumentalities.

10. A teletypewriter system having a subscriber's teletypewriter station connectible to a teletypewriter central office by a telegraph line which normally has current passing over it, said telegraph line being grounded at only the central office, and instrumentalities at the subscriber's station for effecting a recall signal at the central office, said instrumentalities including means for reducing the line current to approximately one-half its normal value.

11. A teletypewriter system having a subscriber's teletypewriter station connected to a teletypewriter central office by a telegraph line which normally has current passing over it, said telegraph line being grounded at only the central office, and instrumentalities at the subscriber's station for effecting a break signal, said instrumentalities including a resistance located at the subscriber's station and connected into the telegraph line but normally short-circuited by a break key, said resistance being adapted to reduce the line current when the break key is opened.

12. A teletypewriter system having a subscriber's teletypewriter station connected to another subscriber's teletypewriter station by a telegraph line leading from the first subscriber's station through a first central office and a second central office and then to the second subscriber's station, said telegraph line normally having current flowing over it, instrumentalities for enabling the subscriber at the first station to give a break signal to the subscriber at the second station without said break signal being registered at the first central office, said instrumentalities including a marginal relay and a polarized relay both located at the first central office and normally operated, and a resistance located at the first subscriber's station and connected into the line but normally short-circuited by a break key, said resistance being adapted to reduce the line current when the break key is opened to an amount small enough to cause the polarized relay to swing its armature and yet large enough to maintain the marginal relay operated.

13. A teletypewriter system having a subscriber's teletypewriter station connected to a teletypewriter central office by a telegraph line which normally has current of a certain amount passing over it, said current being applied at only the central office, said subscriber's station having a motor normally disconnected from a source of power supply by the armature of a normally unoperated marginal relay located at the subscriber's station and connected into the line, a resistance located at the central office and connected into the line, and an instrumentality at the central office for short-circuiting the resistance to increase the line current for operating the marginal relay whereby the power supply is connected to the subscriber's motor.

14. A teletypewriter system having in combination a central teletypewriter office, a subscriber's teletypewriter station having a motor and a power supply source for operating the motor but normally disconnected therefrom, a telegraph line extending from the central office to the subscriber's station and normally closed to direct current, said system having various supervisory signaling arrangements, means for preventing false operation of said supervisory signaling arrangements, said means comprising grounding the line at only the central office, an electroresponsive device for connecting the subscriber's power supply source to his motor, said electroresponsive device being normally non-operated and being bridged across the line at the subscriber's station, and an instrumentality at the central office for operating the electroresponsive device for connecting the subscriber's source of power supply to his motor and for starting the motor.

15. A teletypewriter system having in combination a subscriber's teletypewriter station connected to a teletypewriter central office by a telegraph line which normally has current passing over it, said system having various supervisory signaling arrangements, means for preventing false operation of said supervisory signaling arrangements, said means comprising grounding the line at only the central office, a calling device located at the central office and having a normally open energizing circuit, operating means for closing said normally open energizing circuit to operate the calling device, said operating means including a differential relay located at the central office and connected into the line, said differential relay being responsive to variations in the current flowing over the line, a resistance connected into the line but normally short-circuited therefrom, control means at the subscriber's station for causing the differential relay to effect the closing of said energizing circuit for operating the calling device, said control means including an instrumentality for opening the short circuit for causing the line current to pass through the resistance whereby the line current is varied, an electroresponsive device for opening the energizing circuit of the calling device for discontinuing the operation of the calling device, and supervisory means for controlling the operation of said electroresponsive device.

JOSEPH A. KRECEK.
CHARLES C. MUNRO.